UNITED STATES PATENT OFFICE.

MATTHEW D. MANN, JR., OF ROSELLE, NEW JERSEY, AND ROBERT R. WILLIAMS, OF CHICAGO, ILLINOIS, ASSIGNORS, BY MESNE ASSIGNMENTS, TO SETH B. HUNT, TRUSTEE, OF MOUNT KISCO, NEW YORK.

PROCESS OF MAKING REACTIVE ACID LIQUOR FROM HYDROCARBON GASES CONTAINING OLEFINS.

1,365,043.     Specification of Letters Patent.     Patented Jan. 11, 1921.

No Drawing.     Application filed March 11, 1919. Serial No. 282,055.

*To all whom it may concern:*

Be it known that we, MATTHEW D. MANN, Jr., and ROBERT R. WILLIAMS, citizens of the United States, and residents of Roselle, county of Union, and State of New Jersey, and Chicago, county of Cook, and State of Illinois, respectively, have jointly invented certain new and useful Improvements in Processes of Making Reactive Acid Liquor from Hydrocarbon Gases Containing Olefins, of which the following is a specification.

According to the process of the present invention, gaseous and vaporous material containing unsaturated hydrocarbons, is subjected to the action of a reacting agent or agents in the presence of substantially neutral or inert preferably liquid material, which preferably has a solvent action upon the gases and vapors and serves as a carrier or control medium for the reacting agent.

The process of the present invention is applicable to treatment of gases and vapors of various kinds. It will be described more particularly in connection with the treatment of the gases and vapors obtained from petroleum by refining processes, including distillation, cracking, etc. Such gases and vapors have heretofore been subjected to treatment in the condition in which produced, principally in one of two ways, either by absorption in heavier oils, or by compression and condensing, whereby a proportion of material, principally heavy vapors or liquids entrained with the fixed gases is condensed out in the liquid form and saved. In either case the remaining gaseous material is generally used for burning, as for fuel in the refineries or as an illuminant.

An understanding of modes in which the invention may be carried out will be afforded by the following examples, which, however, are intended only for illustrative purposes and not for the purpose of imposing limitation of the invention.

Example 1: About 860 gallons of petroleum oil having been theretofore treated with sulfuric acid for extraction of unsaturated hydrocarbons therefrom, were placed in a closed vessel equipped with an agitator. To this oil there was added about 50 gallons of sulfuric acid of about 1.8 sp. gr. Petroleum gases and vapors from a petroleum refinery, and containing about 8% of unsaturated hydrocarbons absorbable by cold sulfuric acid of 1.8 sp. gr. were passed into the vessel or churn by a pressure pipe discharging thereinto at substantially the bottom thereof. A discharge pipe from the upper part of churn carried the residual gases to the gas holder. The gaseous and vaporous material treated had previously been compressed to about 160 lbs. per square inch, for removal of condensable materials.

The vessel or churn was equipped with cooling coils and the temperature of the churn contents was maintained thereby at about 15° C. during the operation, the entry of the gases occupying a period of about 8½ hours, during which time agitation of the liquids was maintained by the operation of the mechanical stirrer, as well as by the passage of the gas.

After the gas was shut off the contents of the churn were permitted to settle for about one-half hour, and the acid extract obtained was drawn off from beneath the oil, with which it was substantially immiscible. About 90 gallons of acid extract were obtained which was admixed with water and distilled. The distillate consisted of about 36 gallons of a water solution of alcohols containing about 35% or 12.6 gallons of pure alcohols, and a supernatant layer of about 28 gallons of oil and alcohol containing about 60% or 16.9 gallons of pure alcohols, giving a total alcohol yield of 29.5 gallons of alcoholic material of a boiling point range which indicated that the alcohols produced comprised principally mixtures of propyl and butyl alcohols and smaller quantities of higher alcohols. The residual matter in the still was principally dilute sulfuric acid with only a very small proportion of material other than the acid which did not distil over with steam at atmospheric pressure. It will be seen that the yield of alcohols amounted to substantially 59% of the amount of sulfuric acid of 1.8 sp. gr. used for extraction, making the sulfuric acid cost of the alcohols produced quite low. A considerable portion of the dilute acid can be recovered by concentration.

The gases discharged from the churn were tested for unsaturated hydrocarbons, and a substantial reduction of unsaturation was found, the returning gases showing only about two to three per cent. of material absorbable by sulfuric acid of 1.8 sp. gr.

Example 2: About 1000 gallons of petroleum oil was placed in a closed vessel. To the oil about 108 gallons of sulfuric acid of 1.8 sp. gr. were added, and there was passed therethrough during a period of about eight hours, approximately 100,000 cubic feet of petroleum gas containing about four to five per cent. of unsaturated hydrocarbons. The temperature was kept at about 17° C., by means of cooling coils. At the end of this time, the liquid was allowed to settle, and about 172 gallons of acid extract were withdrawn. The acid extract was added to about 400 gallons of water and the mixture distilled. The crude distillate consisted of about 155 gallons of aqueous solution of alcohols, containing about 20% of alcohols and about 41 gallons of supernatant layer, containing about 47% alcohols, making a total yield of about 50 gallons of pure alcohols. In this case no mechanical agitation was applied, the relatively large quantity of gas introduced serving to keep the mixture in a state of sufficient ebullition to provide the desired agitation and to enable mechanical agitation to be dispensed with.

When impurities such as $H_2S$, water vapor and the like, are present in the gases, they may be subjected to suitable preliminary treatment for removal of such impurities, and the discharged gases may be trapped to prevent their carrying away entrained sulfuric acid or the like and may be further treated by washing, compression, absorption in oils, or the like, for removal of materials which may be condensed or absorbed. With sulfuric acid of 1.8 specific gravity, the temperature of about 15°–17° C., as stated, gives good results. The acid strength may vary somewhat from this figure, but should be below 1.84% specific gravity and in general where stronger acid is used, lower temperatures should be maintained, and with somewhat weaker acid, the temperature may be permitted to rise somewhat, but in any case it is generally advisable to keep the temperature below 30° C.

Without adopting any particular theory as to what takes place during treatment of gases and vapors in manner such as described, it will be seen that the extracting agent, as sulfuric acid, presents an extended surface for contact with the gases when agitated together with the neutral oil substantially in the form of an emulsion, and that rapid extraction of unsaturated components is effectively performed, the contact of the gases and vapors with the extracting agent being increased by the presence of the oil and by its retarding effect on the passage of the gases and vapors which are caused to travel through the acid and oil. The volume of oil used is preferably in excess of the volume of acid, and may advantageously be twice the volume of acid. Even when the proportion of unsaturated components in the gases and vapors is quite low, good results can be obtained in substantially the manner described. The saturated hydrocarbons or other non-reactive gases and vapors, in the examples given, amounted to over 90% of the gaseous material present, but it is to be understood that the proportion of extractable or reactive gaseous and vaporous material may vary within wide limits, according to the materials under treatment, and in some cases substantially all the gaseous and vaporous material may be of reactive or extractable character.

The invention may be carried out with various other gases, as, for example, petroleum gases and vapors direct from petroleum stills, cracking apparatus and the like, may be treated by the process of the present invention without previous treatment for removal of condensable or absorbable materials. Coal gas and coke oven gas may be used, etc. Substantially any inert or neutral diluent vehicle may be used which is substantially non-reactive with the reacting agent or agents for gases and vapors, a variety of reacting agents may be utilized, and various forms of apparatus including vessels equipped with mechanical agitators, may be used in performing the steps of the process.

We claim:

1. The process of making reactive acid liquor, which consists in passing hydrocarbon gases containing olefins into intimate contact with sulfuric acid in the presence of a non-reactive absorbent for the gases.

2. The process of making reactive acid liquor, which consists in bringing hydrocarbon gases containing olefins into intimate contact with sulfuric acid in the presence of a non-reactive absorbent for the gases, while maintaining the temperature below 30° C.

3. The process of making reactive acid liquor, which consists in bringing hydrocarbon gases containing olefins into intimate contact with sulfuric acid in the presence of a non-reactive hydrocarbon oil.

4. The process of making reactive acid liquor, which consists in bringing hydrocarbon gases containing olefins into intimate contact with sulfuric acid in the presence of a non-reactive hydrocarbon oil, while maintaining the temperature below 30° C.

5. The process of making reactive acid liquor, which consists in bringing petroleum still gases containing olefins into intimate contact with sulfuric acid in the presence of a non-reactive hydrocarbon oil, while maintaining a temperature below 30° C.

6. The process of making reactive acid liquor, which consists in bringing petroleum still gases containing olefins in admixture with saturated hydrocarbons into intimate contact with sulfuric acid in the presence of a non-reactive hydrocarbon oil having a volume in excess of the volume of the sulfuric acid and effecting a gravity separation of the reactive acid liquor from residuary materials.

7. The process, of making reactive acid liquor, the constituents whereof correspond to the olefins of petroleum still gases having more than two carbon atoms, which consists in bringing petroleum still gases containing such olefins in admixture with saturated hydrocarbons into intimate contact with sulfuric acid of a strength corresponding to a specific gravity of less than 1.84 in the presence of a non-reactive hydrocarbon oil, while maintaining the temperature below 30° C.

In testimony that we claim the foregoing, we have hereto set our hands, this 7th day of March, 1919.

MATTHEW D. MANN, Jr.
ROBERT R. WILLIAMS.